(No Model.) 6 Sheets—Sheet 1.

R. J. MONTGOMERY.
COMBINED PARLOR AND SLEEPING CAR.

No. 370,882. Patented Oct. 4, 1887.

Fig. 1.

WITNESSES:

INVENTOR
R. J. Montgomery
BY
ATTORNEYS (No Model.) 6 Sheets—Sheet 2.

R. J. MONTGOMERY.
COMBINED PARLOR AND SLEEPING CAR.

No. 370,882. Patented Oct. 4, 1887.

(No Model.) 6 Sheets—Sheet 3.

R. J. MONTGOMERY.
COMBINED PARLOR AND SLEEPING CAR.

No. 370,882. Patented Oct. 4, 1887.

WITNESSES: INVENTORS,
R. J. Montgomery.
BY
ATTORNEYS (No Model.) 6 Sheets—Sheet 4.

R. J. MONTGOMERY.
COMBINED PARLOR AND SLEEPING CAR.

No. 370,882. Patented Oct. 4, 1887.

WITNESSES:

INVENTOR
R. J. Montgomery
BY
ATTORNEYS

(No Model.) 6 Sheets—Sheet 5.

R. J. MONTGOMERY.
COMBINED PARLOR AND SLEEPING CAR.

No. 370,882. Patented Oct. 4, 1887.

WITNESSES:

INVENTOR
R. J. Montgomery
BY
Townsend
ATTORNEYS

UNITED STATES PATENT OFFICE.

ROBERT J. MONTGOMERY, OF BROOKLYN, NEW YORK.

COMBINED PARLOR AND SLEEPING CAR.

SPECIFICATION forming part of Letters Patent No. 370,882, dated October 4, 1887.

Application filed January 19, 1887. Serial No. 224,762. (No model.)

*To all whom it may concern:*

Be it known that I, ROBERT J. MONTGOMERY, a citizen of the United States, and a resident of Brooklyn, in the county of Kings and State of New York, have invented a certain new and useful Combined Parlor and Sleeping Car, of which the following is a specification.

My invention relates to improvements in combined parlor and sleeping cars.

The object of my invention, generally speaking, is to improve the sleeping arrangements of such cars, and at the same time preserve as far as possible the desirable features of the ordinary parlor-car for day use, including the usual fittings of revolving chairs, unencumbered window-spaces, &c.

Heretofore in cars of this general description the sleeping-compartments have been built up from transverse stationary seats, which are large and cumbersome, and which render the car inconvenient and unsightly for day use. This system also involves the use of heavy overhanging fittings in the top of the car, which, together with the heavy seats, unduly increase the weight of the car, thereby increasing the wear on the road-bed, and consequently the operating expenses of the road. In one form of car an attempt has been made to combine the use of revolving chairs for day use with the usual sleeping arrangements; but in that car the chair forms no component part of the car as made up for night use. In making up such car, therefore, as a sleeper, it is necessary in the first place to make some provision for stowing the chair, which must necessarily encumber the space and unduly increase the weight of the car. It also follows from this construction that the entire compartment must be unfolded from the side of the car, instead of sectional parts of the same, as in my system, which obviously permits of a different kind of treatment, so as to preserve the contour of the car, the large window-spaces, and the balancing of the weight of the car from top to bottom.

The object of my invention with regard to the sleeping arrangements proper is to give to the occupant of a berth the absolute privacy of a room or compartment, in which he will be wholly free from observation, in place of a comparatively open space closed in more or less securely by hanging curtains, as in the system now in use. This will greatly promote the comfort of the traveling public with regard to the most objectionable feature of night travel.

A further object is to render the berth wholly free from intrusion, whether accidental or designed, by placing the entrance or exit to the same fully under the control of the occupant, the same as in any room of a hotel or house, and also to provide a dressing-space to be used at will by the occupant of the lower berth.

Another object of the invention is to provide for the adequate ventilation of the berths by dispensing with the use of curtains, which prevent the circulation of air, and in course of time become impregnated with the disagreeable odors of foul air.

The object of the invention is, further, to permit the construction of a sofa from two or more chairs at will.

Another important object of my invention, having regard to the interests of the railroad company, is to lighten the car and to dispose the weight in the most advantageous manner, as also to make a car which will serve the double purpose of a parlor-car and a sleeping-car, thus permitting the same car to be in continuous use, thereby saving largely in equipment.

To these various ends my invention consists in a revolving chair of peculiar construction adapted to enter as a component part into the structure of the sleeping-compartment.

It also consists in building up berths or compartments from parts taken from or unfolding from the side of the car, and which shall be walled in on all sides and provided with a door or equivalent means of entrance under the control of the occupant.

It also consists in locating the entrances to the berth on the end thereof, so that the occupant may pass in and out through a berth-aisle which shall be more or less screened from observation.

It also consists in providing one or more sides of the berths or compartments with slatted screens or blinds, giving to the berth or compartment the ventilation of the car without exposing the occupant.

It further consists in certain arrangements and combinations of devices for carrying out these more general features of my invention, as will be more particularly described in connection with the drawings, and pointed out in the claims.

In the accompanying drawings.

Figure 1:
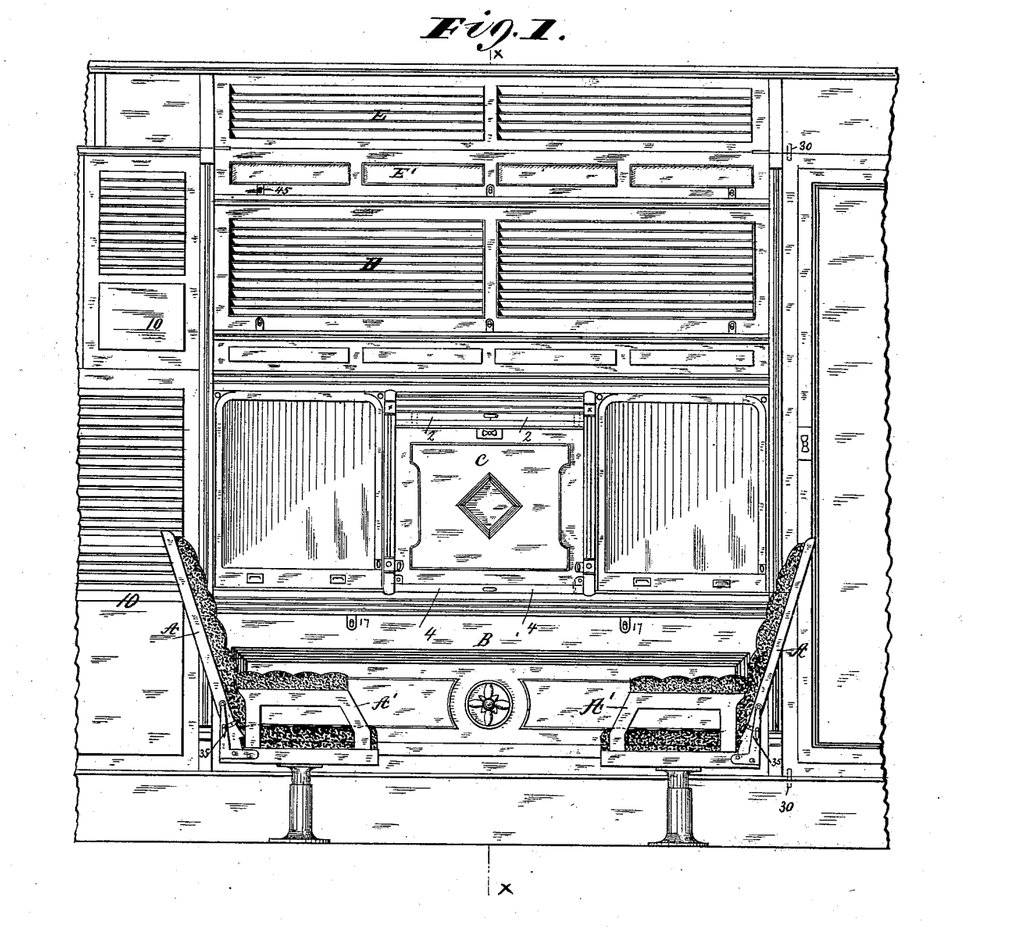
Figure 1 is a side elevation of a part of one side of the car embodying my invention as disposed for day use.
Figure 3:
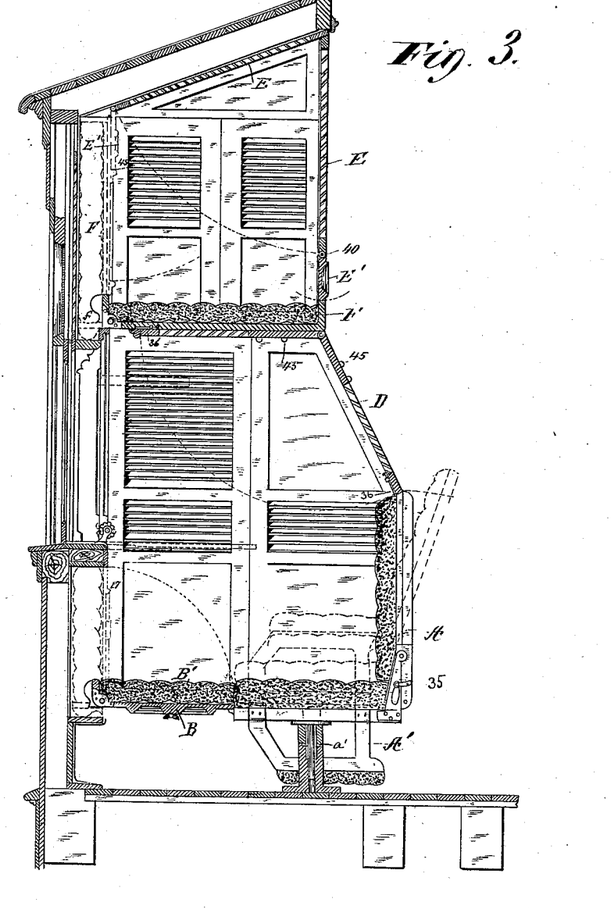
Fig. 3 is an end elevation, partly in section, showing the berth made up.

The chairs A, disposed for the use of passengers during the day, as seen in Fig. 1, are revolving chairs of ordinary description, having no peculiarity so far as the seat is concerned, except that they are slightly narrower in the seat than the chairs commonly used, and that the backs are correspondingly more inclined in order to give greater ease and comfort, and also that the decrease in the width of the chair may not be objectionable. The chairs are arranged, however, by means of devices which will be presently referred to, to be lowered a short distance—say two inches and a half—so that the seats may be on a level with the lower berth when the car is made up as a sleeper. The arms of the chair are suitably hinged to the seat and are adapted to fold down below the level of the chair, but clear of the floor, as seen in Fig. 3. The back of the chair is pintle-hinged or otherwise pivoted jointed, so that it may be brought to a perpendicular, as shown in Fig. 3, and held in that position by means of the locking-plate and stud of any ordinary construction, (indicated at 35,) and consisting, preferably, of a spring-stud mounted in a plate or upright rising from the chair-frame and adapted to engage with either of two sockets in a plate fixed to the side of the chair-back. Each sleeping-compartment involves the use of two chairs, which are brought into the position shown in Fig. 3, facing the window, with the side arms folded down and the back brought to perpendicular, and secured in that position by means of the locking-plate and stud 35.

Folding into the side of the car beneath the windows is a portion of the lower berth, (indicated at B.) The berth B is hinged at the bottom and provided with a counter-weight, and held at the top in its closed position by snap-catches of any desired construction, (indicated at 17 17,) or in any other suitable manner. The berth, when open, rests upon and is supported by lugs (indicated at 76) on the front edge of the chair-seats. These lugs should be adapted to turn back into cavities in the chair in the day-time, so as to be flush with its outer surface.

In the side of the car, behind the lower berth, is formed a pocket containing the mattress B' for the lower berth, B. This mattress fits the space between the chairs and the side of the car, and when placed upon the lower berth its upper surface is on a level with the top of the cushion of the chair-seats.

Between alternate windows of the car and between the upper and lower berths is located a panel, (indicated at C,) which I term the "adjustable seat." This panel is removably secured by means of spring-bolts, one at the top and one at the bottom, passing into the window-jambs, or by any other suitable means. This seat-panel or adjustable seat fits the space between the two chairs, resting on the side ledges thereof when the chairs are turned with their backs to the center aisle of the car and completing the deck of the lower berth.

Figure 2:
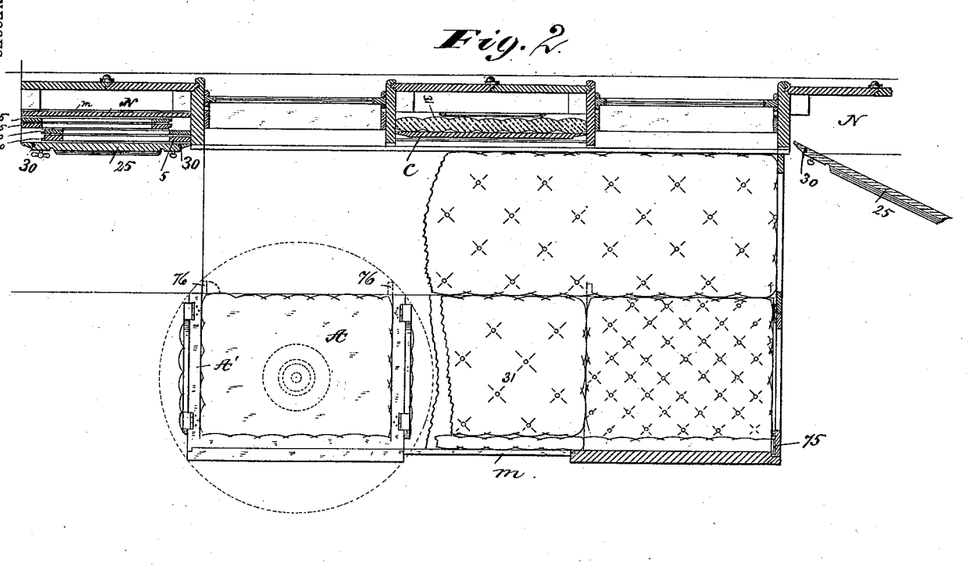
Fig. 2 is a plan view, partly in section, of a part of one side of the car, showing the arrangements for making up the lower berth.

In a pocket in the side of the car behind the adjustable seat is a mattress, 31, as shown in Fig. 2, which fits the adjustable seat.

Folding into the side of the car above the windows is the upper berth, (indicated at F.) It is hinged at the bottom, as shown, and is provided with a counter-weight of any well-known description, as indicated at f. The upper berth is held in its closed position by snap-hooks, or similar devices suitable for the purpose, as described in connection with the lower berth. It is sustained in its open position by connections from the upper-berth hanger and flap, which is in turn suspended from the deck-sill or any other part of the roof.

Figure 4:
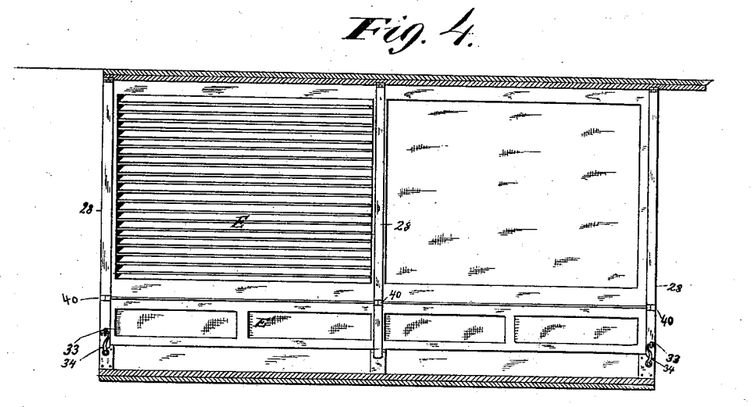
Fig. 4 is an inside elevation of the upper-berth hanger, flap, and berth.

The upper-berth hanger (indicated at E) consists of a screen, of wood or other suitable material adapted to form a rigid wall of the berth, and is hinged to the deck-sill or any other part of the roof. It is provided with slatted openings to permit a free circulation of air. It is roller-jointed to the flap E' at the joint 40, to allow the whole to be folded against the roof and side of the car. During the day the hanger E and the flap E' are folded against the roof and upper side of the car, as shown in Figs. 1 and 3, and are held in their positions by snap-hooks on the outer side of the lower edge of the flap E', as indicated at 45, Figs. 1 and 3, which snap-hooks take into recesses in the outer face of the upper berth when folded away. When these parts are unfolded from the roof and side of the car and swung down into a vertical position, they just reach the outer edge of the upper berth, thereby completing the front of the upper berth. The berth is connected to them, so as to be sustained from the roof of the car, by means of two iron straps, 28, as shown in Fig. 4, extending from the roof of the car along the inside of the hanger E and flap E', and provided with eyelets or staples at their lower ends, (indicated at 33,) into which take the hooks 34 on the edge of the upper berth. The straps 28 are jointed at the point 40, where they pass from the hanger E to the flap E'.

Hinged to the outer edge of the upper berth, F, is a lower-berth hanger, D. This hanger consists also of wood or other suitable material, and is suitably constructed to form, when the berth is made up, a rigid wall or partition securing the occupant of the berth from intrusion. This hanger is also provided with slatted openings, as shown, for purposes of ventilation. The hanger is adapted to be folded up against the side of the upper berth when not in use, and may be held in that position by snap-hooks or equivalent devices. When the berths are made up, the hanger is swung downwardly and outwardly until its lower edge rests upon the upper edge of the chair-backs, thereby partially forming the front of the lower berth. The lower edge of the hanger rests in a ledge in the top of the chair-backs, after the manner of a hansom-cab window, as indicated in Fig. 3, and is secured in position by means of snap-hooks, bolts, or other devices taking into the back of the chair, as indicated at 36.

In the side of the car and opposite the intervals between the compartments there is formed a series of pockets, N, Fig. 2, for the reception of the sectional parts which make up the ends of the berths. These pockets are concealed from view in the day-time by a removable panel, 25, flush with the side of the car and decorated in harmony with the ornamentation of the car. The pockets N and the panel 25 extend along the side of the car the full height of the two berths, so as to contain sectional parts which shall completely form the ends of the berths.

In the pockets N are the folders 5 5 10 10, adapted to unfold forward and outward in opposite directions, to form the opposite ends of the adjacent berths. These folders are provided, like the berth-hangers, with slatted openings for purposes of ventilation. There are separate sets of folders for the upper and lower berths for convenience in making up the berths.

It is evident that the panel 25 may be removably secured to the side of the car in a variety of ways, and that the folders 5 5 and 10 10 may be taken out to form the ends of the berths in a variety of ways. I have, however, illustrated in the drawings one mode of accomplishing these results, which I will now describe.

The panel 25 is provided with top and bottom bolts, 30 30, on both sides, so that when the bolts on either side are unlocked the two bolts on the other side may act as pintle-hinges on which the panel may be swung outward to uncover the folders, as indicated at the right hand of Fig. 2. The folders turn back in two leaves each into the pockets, a leaf of one folder being hinged to one side of the pocket, and a leaf of the other folder being hinged to the other side of the pocket, so that they may swing outward in opposite directions to form the opposite ends of adjacent berths.

The operation of the devices just described is as follows: The bolts on one side of the panel having been unlocked, as shown in Fig. 2, the panel is swung outward upon the bolts on the other side, which act as pintle-hinges for the time being. This movement of the panel discloses the outer set of folders, which are then swung outward to form the end of the berth. The panel is then returned to its position, and the two bolts which before formed the pintle-hinges are now unlocked and the panel is swung in the opposite direction upon the other two bolts, acting as pintle-hinges, thereby permitting the inner pair of folders to open in an opposite direction from the first, to form the opposite end of an adjacent berth. After the folders have been taken out to form the ends of the berth, the panel 25 is then returned to its position, closing the pocket and forming the end of the berth-aisle, as before.

The construction and operation of these devices for forming the ends of the upper and lower berths being nearly duplicates of each other, it is unnecessary to describe the two sets of devices in detail. The folders of the lower berth are secured in position by snap-hooks, bolts, or other devices located on their inside outer edges and taking into recesses in the backs of the chairs, as indicated at 75 in Fig. 2. The folder forms the door for the berth-opening into the berth-aisle of the car.

Figure 14:
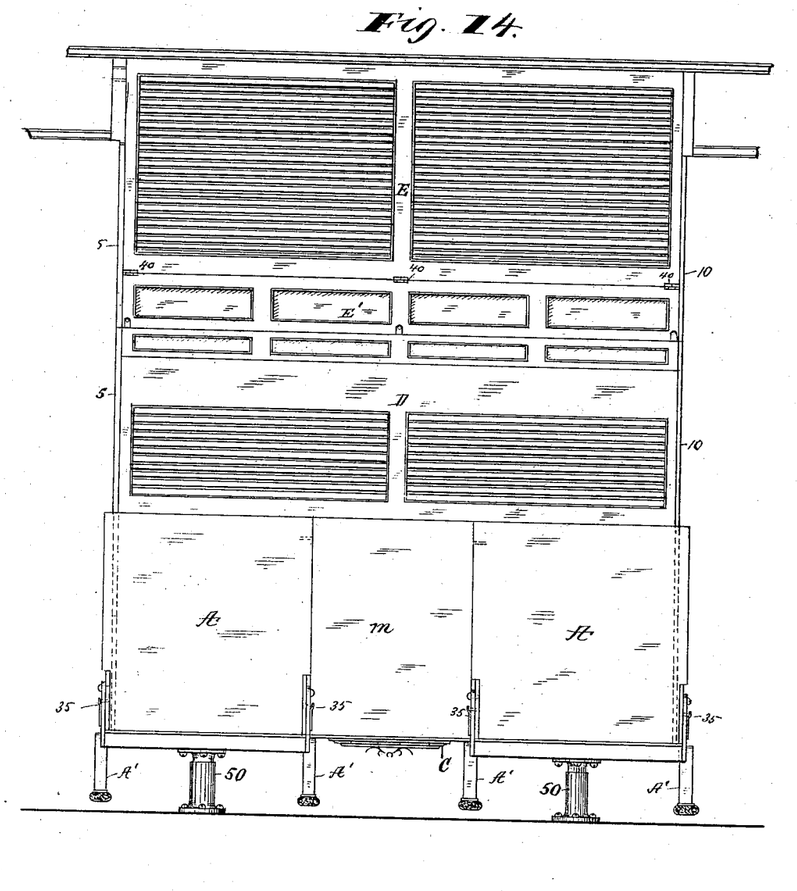
Fig. 14 shows in side elevation the two berths of the car as they appear from the center aisle made up.

It is obvious that the ends of the berth-aisles where they open on the center aisle may be closed, if desired, by suitable screens or partitions, which may be put in place when desired, and may be mounted as doors or otherwise, so that the berth-aisle may form a dressing-alcove for the occupants of the berths, which will screen them from the observation of persons passing through the car. The screen door or partition might be formed on or attached to the folders, and constitute a hinged or pivoted extension of the same. I do not limit myself, however, to any particular devices for this purpose, as, if desired, a curtain might be employed, or the screen might be carried in any portion of the car and mounted and supported at the end of the berth-aisle by any convenient mechanical devices. In Fig. 14 the side of such a screen is indicated.

In the pocket N and behind the folders 5 5 and 10 10 is placed the adjustable back $m$, which fits the space between the backs of the chairs and completes the front of the lower berth. The adjustable back $m$ is placed in the pocket N for convenience; but it will be understood of course in this connection and in connection with other sectional parts whose location in particular parts of the car I have described that my invention is not limited to the precise location of these parts so long as they are removably secured in any convenient position in the side or other portion of the car.

Figure 5:
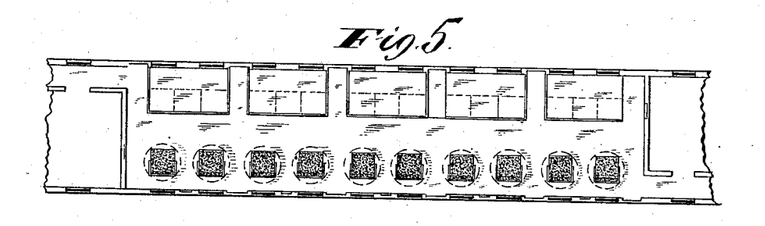
Fig. 5 is a plan view of a car embodying my invention, one half as made up for day use and the other half for night use.
Figures 6, 7, 12, 13:
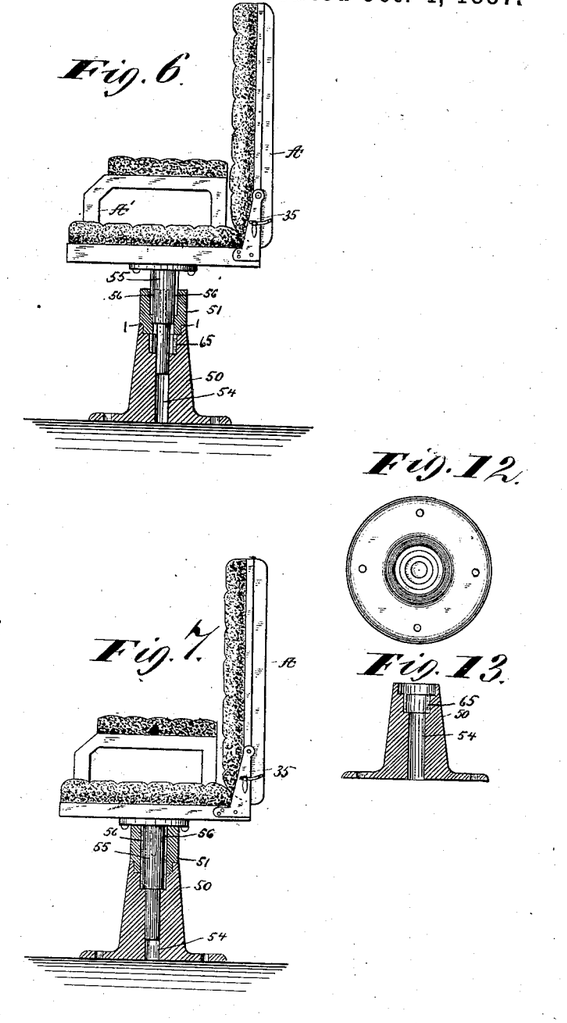
Fig. 6 is a side elevation of the chair, showing the pedestal in section and the chair in the upper of its two positions.
Fig. 7 is a similar view showing the chair down.
Fig. 12 is a plan of the pedestal.
Fig. 13 is a vertical section of the same.
Figure 8:
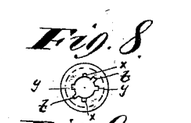
Fig. 8 is a top view of the thimble.
Figure 9:
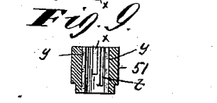
Fig. 9 is a vertical section of the same.
Figures 10, 11:
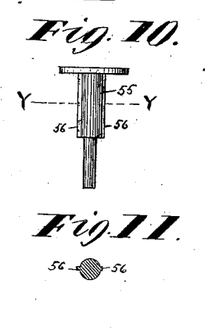
Fig. 10 is a detail view showing the spindle that is attached to the bottom of the chair.
Fig. 11 is a cross-section on the line Y Y of Fig. 10.

The operation of converting the parlor-car, as shown in the lower half of Fig. 5, into a sleeper, as indicated in the upper half of Fig. 5, is briefly as follows: The two chairs designed to enter into the construction of a berth or compartment are first turned to face the window. They are then lowered in their sockets, as described. The arms are folded below the level of the chair, but clear of the floor, and the backs are brought to perpendicular and fastened in that position by the stud 35. The adjustable seat C is then removed from the side of the car between the windows and placed between the chairs and resting upon their edges. The small mattress 31 is then removed and placed upon the same, being flush with the chair-cushions. The lugs on the front of the two chair-seats are then turned out, and the lower berth, with mattress B' buckled or otherwise secured to the same, is unlatched and opened down upon said lugs, the mattress being flush with the seats of the chairs. The upper-berth hanger E and its flap E' are then released, and the upper berth, with the mattress buckled or otherwise secured to same, is then lowered into position and secured to the straps 28 in the manner described, thus forming the deck of the upper berth. The folders are then swung outward in the manner above described to form the ends of the berth, thereby exposing the adjustable back m, which is placed in its proper position between the backs of the chairs. The berths are completed by releasing the lower-berth hanger D, which is secured in position upon the backs of the chairs, as described.

Turning brackets, clothes-hooks, &c., may be arranged so as to turn back flush with the side of the car in the day-time, and to open out, as indicated in Fig. 3, when the berth is made up.

It is obvious that the two chairs with the intermediate adjustable seat may be utilized as a sofa, when desired, without making use of any other of the parts of the berth.

In making up the lower berth it will be observed that after the porter has arranged his sheets, blankets, &c., for the night they may be folded off the part of the deck formed by the chairs and adjustable seat and laid over on top of the mattress proper, and then the berth and mattress turned up into the side of the car, leaving the pillows on the chairs, thus allowing the occupant to sit on the sofa or lounge formed by the chairs and adjustable seat (this sofa or lounge, so formed, being a feature of the parlor-car during the day) with feet on the floor between the sofa and side of the car while disrobing, after which the occupant may drop the berth and mattress from the side of the car and unfold his bedclothes for the night. This is a very desirable feature of my car, and is designed to answer a great many purposes for which berths as ordinarily made up are wholly inapplicable.

The devices for raising and lowering the chairs, adjusting their backs, &c., (shown in Figs. 6 to 13 of the drawings,) will not be made the subject of claim in this application, as I design to file a separate application therefor. It will only be necessary at this time, therefore, to point out briefly the construction and operation of the devices for raising and lowering the same.

The spindle 55 of the chair is provided with two splines or projections, 56, which engage with grooves $x\ y$ in a thimble, 51, adapted to revolve on the chair-pedestal 50. The lower end of the spindle works in the bore 54, which bore at its upper end is grooved with vertical grooves 65, as indicated. The grooves $x\ x$ extend part way down the inner side of the thimble 51, while the grooves $y\ y$ extend clear through the same, so that the splines 56, when adjusted to engage with grooves $y\ y$, may pass down through the thimble and rest in the grooves 65 of the pedestal 50. In this position the chair is held from turning. For day use the chair and spindle are lifted and the splines allowed to pass into grooves $x\ x$. The chair then rests upon the thimble, which in turn rests upon and may be revolved with the chair on the pedestal. When the chair is to be lowered for night use, it is lifted so as to raise the splines out of the grooves $x$, and turned until the splines engage with grooves $y$, when it may be lowered to its lowest position, as indicated in Fig. 3, so that the splines will engage with the grooves 65 in the fixed pedestal.

What I claim as my invention is—

1. A day and sleeping car provided by day with a series of revolving chairs and by night with a series of made-up berths involving said chairs in their construction, and having rigid walls on all sides, as and for the purpose described.

2. A sleeping-car provided with a series of made-up berths with rigid walls on all sides, composed of sectional rigid parts taken from the side of the car, as and for the purpose described.

3. A day and sleeping car provided by day with a series of revolving chairs and by night with a series of made-up berths or compartments involving such chairs in their construction, each berth opening at its end into a cross-aisle of the car.

4. A sleeping-car provided with a series of made-up compartments and berths, the berths having rigid walls on all sides and opening on either end by a door or equivalent device under the control of the occupant into a berth or cross-aisle of the car, as and for the purpose described.

5. A day and sleeping car provided with a series of revolving chairs by day and by night with a series of made up berths involving such chairs in their construction, and having rigid walls on all sides, one or more of which are provided with slatted openings, as and for the purpose described.

6. A sleeping-car provided with a series of made-up berths with rigid walls on all sides, composed of sectional rigid parts taken from the side of the car, one or more of said walls being provided with slatted openings, as and for the purpose described.

7. A sleeping-car provided with a series of made-up berths with rigid walls on all sides, one or more of said walls being provided with slatted openings, and each berth opening into a berth-aisle of the car by means of a door or equivalent device, as and for the purpose described.

8. A combined parlor and sleeping car provided with a series of revolving chairs for day use and a series of made-up compartments for night use, embracing said chairs as a constituent part thereof, as and for the purpose described.

9. A combined parlor and sleeping car containing a series of chairs for day use and a series of made-up berths for night use, embracing said chairs as a constituent part thereof, said berths having rigid walls on all sides and opening into a berth-aisle of the car, as and for the purpose described.

10. In a combined parlor and sleeping car, a series of chairs suitable for day use, which are adapted to be lowered at night to enter as constituent parts into the construction of made-up compartments and berths, as and for the purpose described.

11. In a combined parlor and sleeping car, a series of revolving chairs suitable for day use and provided with swinging arms adapted to fold down beneath the deck of the berth, whereby said chairs may enter as the constituent parts of made-up compartments and berths, as and for the purpose described.

12. In a combined parlor and sleeping car, a series of chairs provided with adjustable backs whereby said chairs may become a constituent part of the berth and walls of made-up berths or compartments, as and for the purpose set forth.

13. In a combined parlor and sleeping car, a series of revolving chairs provided with hinged arms, adjustable backs, and adapted to be lowered, whereby they may become a part of made-up compartments or berths, as and for the purpose set forth.

14. In a combined parlor and sleeping car, a made-up lower berth embracing the chair-seats and chair-backs of a revolving chair as constituent parts of the deck and front thereof, as and for the purpose set forth.

15. In a combined parlor and sleeping car, a lower berth made up of the chair-seats and chair-backs of a revolving chair, together with sectional rigid parts taken from the side of the car to fill the remaining spaces, as and for the purpose set forth.

16. In a combined parlor and sleeping car, the combination, with the chair-seats of revolving chairs, of a lower berth folded into the side of the car beneath the window and adapted when open to form the deck of the lower berth between the chair-seats and the side of the car, as and for the purpose set forth.

17. In a combined parlor and sleeping car, the combination, with a pair of chairs, of an adjustable seat-panel detachably secured in the side of the car and adapted to fit the space between the chairs to form the deck of the lower berth, as and for the purpose described.

18. In a combined parlor and sleeping car, the combination, with the chairs, of a lower berth and an adjustable seat-panel detachably secured in the side of the car, the whole forming the deck of the lower berth, as and for the purpose set forth.

19. The combination, with a pair of chairs, of an adjustable back-panel detachably secured in the side of the car and adapted to fill the space between the backs of the chair to form the front of the lower berth, as and for the purpose set forth.

20. The combination, with the chairs, of an adjustable seat-panel adapted to fill the spaces between the seats and backs of the chairs, as and for the purpose set forth.

21. The combination, with the adjustable chair-backs, of a lower-berth hanger suspended from the upper berth and adapted to form the front of the lower berth, as and for the purpose described.

22. The combination, with the adjustable chair-backs, of an adjustable back-panel and a lower-berth hanger suspended from the upper berth, the whole forming the front of the lower berth, as and for the purpose set forth.

23. The combination, with the adjustable backs of a pair of chairs, of folders forming the ends of the lower berth and detachably secured in pockets in the side of the car, as and for the purpose set forth.

24. The combination, with the adjustable chair-backs, of folders forming the ends of the lower berth and detachably secured in pockets in the side of the car, and adapted to open outward and forward, and be secured to the chair-backs to form the ends of said berth, as and for the purpose set forth.

25. The combination, with the adjustable chair-backs, of a lower-berth hanger hinged to the outer edge of the upper berth and adapted to swing down and rest upon the upper edge of said chair-backs, as and for the purpose set forth.

26. In a sleeping-car, a lower berth made up of a deck comprising the chair-seats, a folding lower berth and an adjustable seat-panel, a front comprising the chair-backs, an adjustable back-panel, and a lower-berth hanger suspended from the upper berth, and ends comprising folders swinging outward and forward from pockets in the side of the car, as and for the purpose described.

27. In a sleeping-car, a made-up compartment provided with a made-up lounge or half-berth and a floor-space for dressing or standing, as and for the purpose described.

28. In a sleeping-car, a made-up compartment provided with a made-up lounge or half-berth and a floor-space extending the length of the compartment and adjoining the corridors, as and for the purpose set forth.

29. In a sleeping-car, a made-up compartment provided with a floor-space and a lounge or sofa made up of the chair-seats and a removable seat-panel, as and for the purpose set forth.

30. In a combined parlor and sleeping car, an upper berth folding into the side of the car and adapted to be held in its open position by connection with a hanger and flap forming the front of the upper berth, as and for the purpose set forth.

31. In a combined parlor and sleeping car, an upper berth folding into the side of the car above the windows, carrying on its under and outer face a lower-berth hanger hinged at the outer edge of said berth, as and for the purpose described.

32. In a sleeping-car, an upper-berth hanger and flap suspended from the roof of the car, as and for the purpose set forth.

33. In a sleeping-car, an upper-berth hanger and flap suspended from the roof of the car and folding against the roof and side when not in use, as and for the purpose set forth.

34. In a sleeping-car, an upper-berth hanger provided with a hinged extension or flap to complete the front of the upper berth, as and for the purpose set forth.

35. An upper-berth hanger and flap folding against the roof and side of the car when not in use, as and for the purpose set forth.

36. An upper-berth hanger and flap suspended from the roof of the car and provided with connections to sustain the upper berth, as and for the purpose set forth.

37. In a combined parlor and sleeping car, a series of panel-covered pockets in the side of the car, a series of removable panels in the side of the car and flush therewith opposite the spaces between the compartments.

38. In a combined parlor and sleeping car, a series of panel-covered pockets in the side of the car, opposite the spaces between the compartments, for holding sectional parts of made-up berths, as and for the purpose set forth.

39. In a combined parlor and sleeping car, a pocket in the side of the car covered by a panel which is provided with sliding bolts on both sides, so that the panel may swing from either side upon either set of sliding bolts as pintle-hinges, as and for the purpose set forth.

40. In a combined parlor and sleeping car, a pocket in the side of the car containing two folders hinged to opposite sides thereof, and a panel covering such pocket and adapted to swing to the right or left successively to admit of the unfolding of such folders and to then cover such pocket, as and for the purpose described.

41. In a combined parlor and sleeping car, folders forming the ends of made-up berths, taken from pockets in the side of the car opposite the spaces between the compartments, as and for the purpose described.

42. In a combined parlor and sleeping car, a pocket in the side of the car containing a pair of folders swinging outwardly in opposite directions to form the opposite ends of adjacent berths, as and for the purpose set forth.

43. In a sleeping-car, an upper berth made up of a deck folding into the sides of the car above the windows, a front hanger swinging downwardly and outwardly from the roof and side, and end folders swinging outward and forward from pockets in the side of the car, as and for the purpose described.

44. The combination, with an upper berth folding into the side of the car, of upper-berth folders swinging outward and forward from pockets in the side of the car, forming the ends of the upper berth, as and for the purpose described.

45. The combination, with an upper berth folding into the side of the car, of upper-berth folders swinging outward from pockets in the side of the car, and an upper-berth hanger and flap swinging downward from the roof and side of the car to form the front of the upper berth, as and for the purpose set forth.

46. In a combined parlor and sleeping-car, the combination, with the side of the car, of the following devices: a lower berth folding under the windows, an upper berth folding between the top of the windows and the roof of the car, a hanger and flap folded against the roof and side of the car, a hanger folded against the lower side of the upper berth, a removable panel between the windows and the berths, and a panel-covered pocket between every pair of windows, as and for the purpose described.

Signed at New York, in the county of New York and State of New York, this 6th day of January, A. D. 1887.

ROBERT J. MONTGOMERY.

Witnesses:
WM. H. CAPEL,
GABRIEL J. W. GALSTER.